Figure 5:
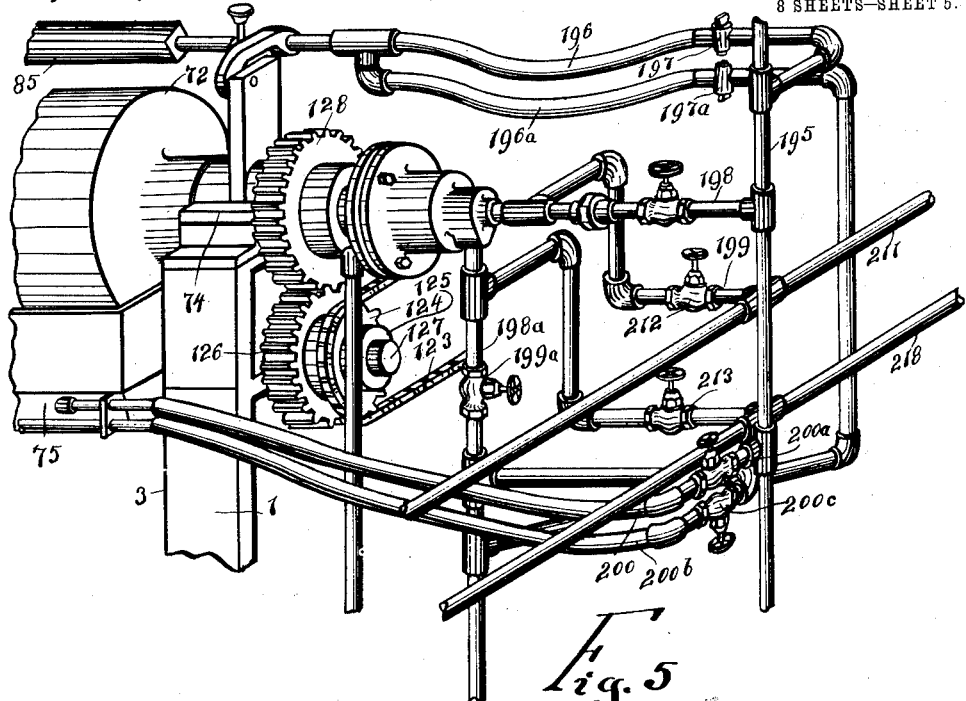

C. W. MAYER.
COATING MACHINE.
APPLICATION FILED NOV. 24, 1911.
1,043,021.
Patented Oct. 29, 1912.
8 SHEETS—SHEET 1.
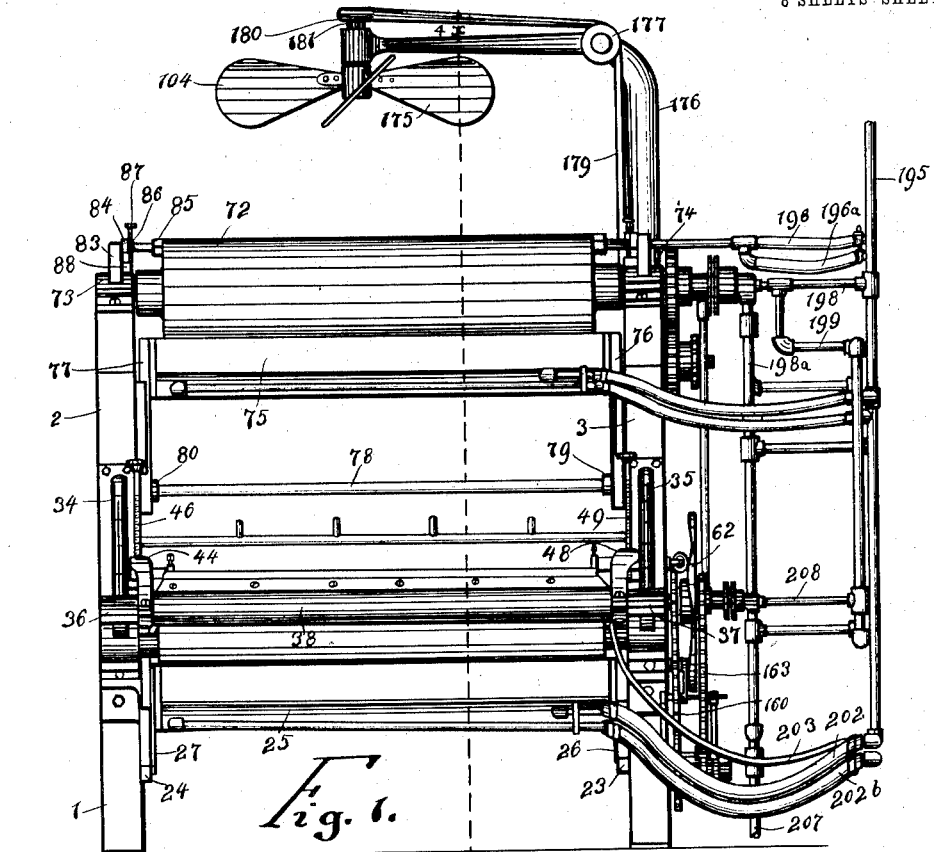
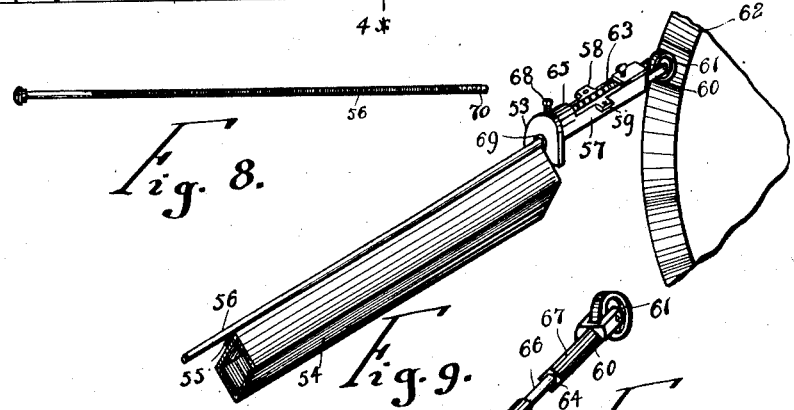
Witnesses
Inventor
Charles W. Mayer
By Frank Keiper
Attorney

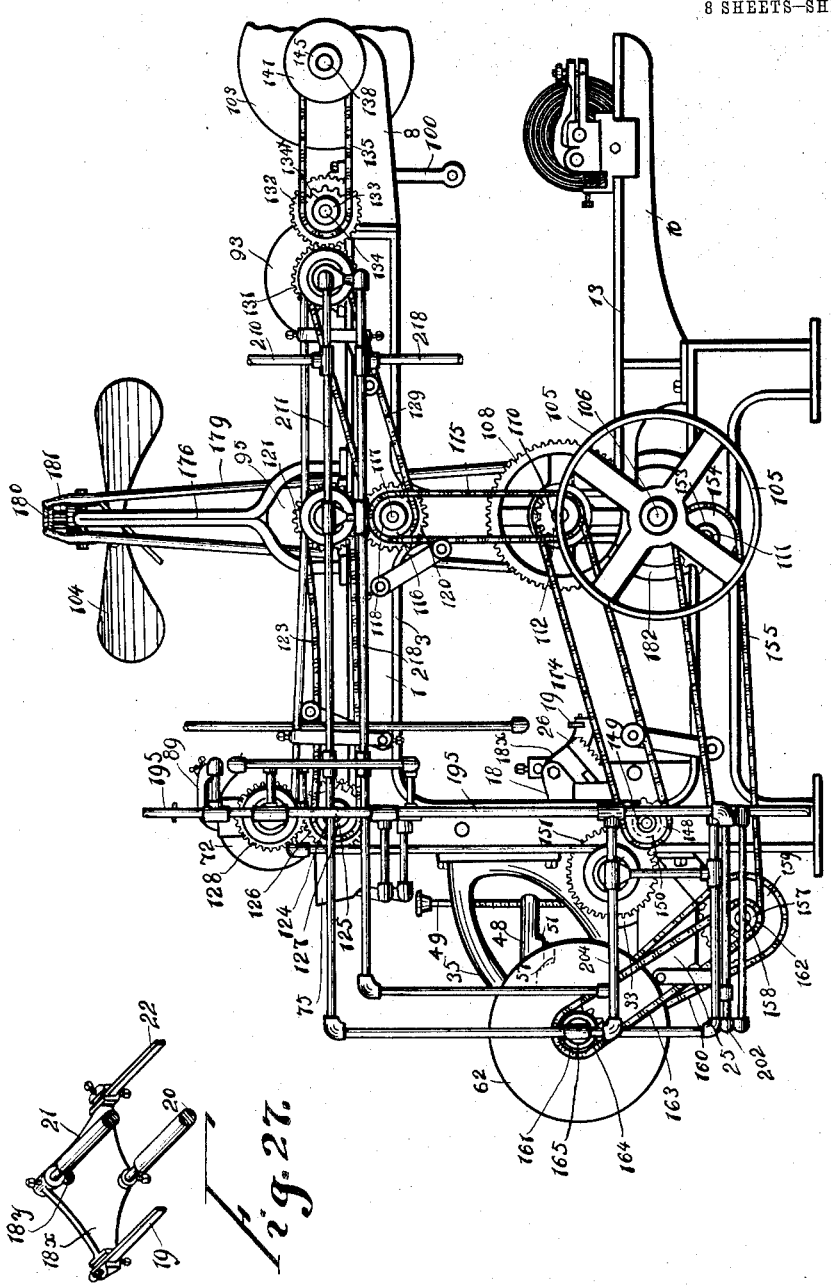

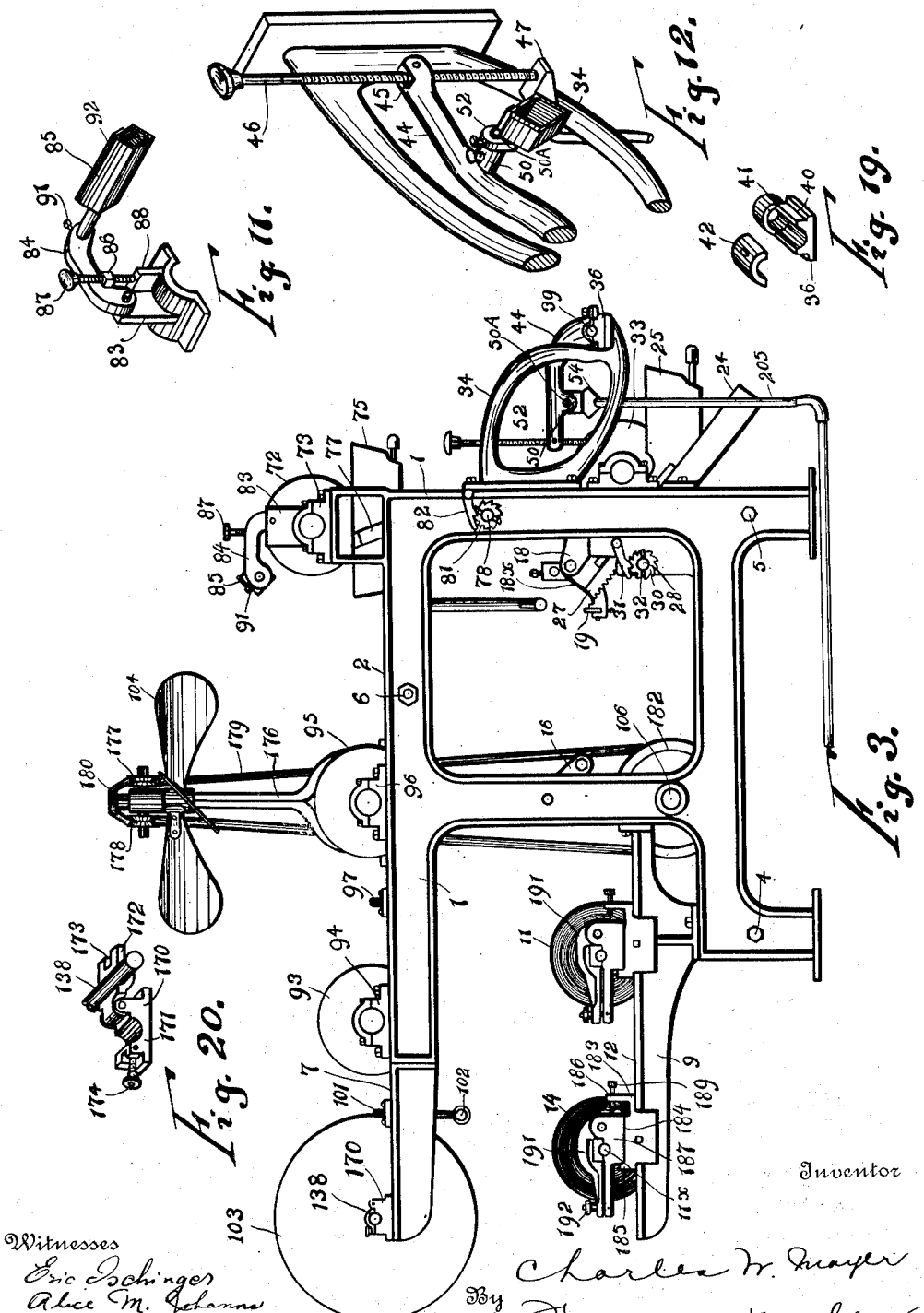
C. W. MAYER.
COATING MACHINE.
APPLICATION FILED NOV. 24, 1911.
1,043,021.
Patented Oct. 29, 1912.
8 SHEETS—SHEET 3.

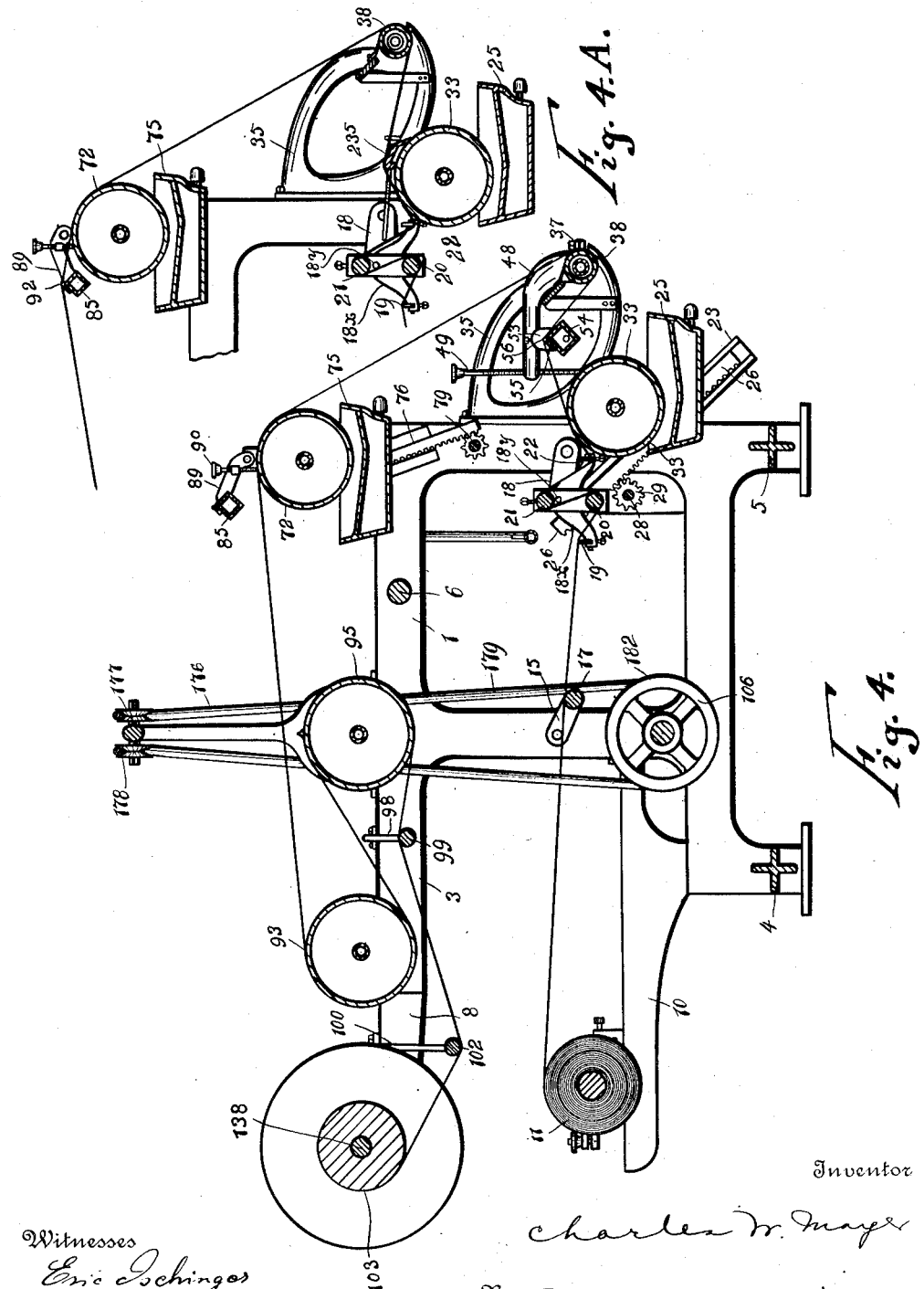

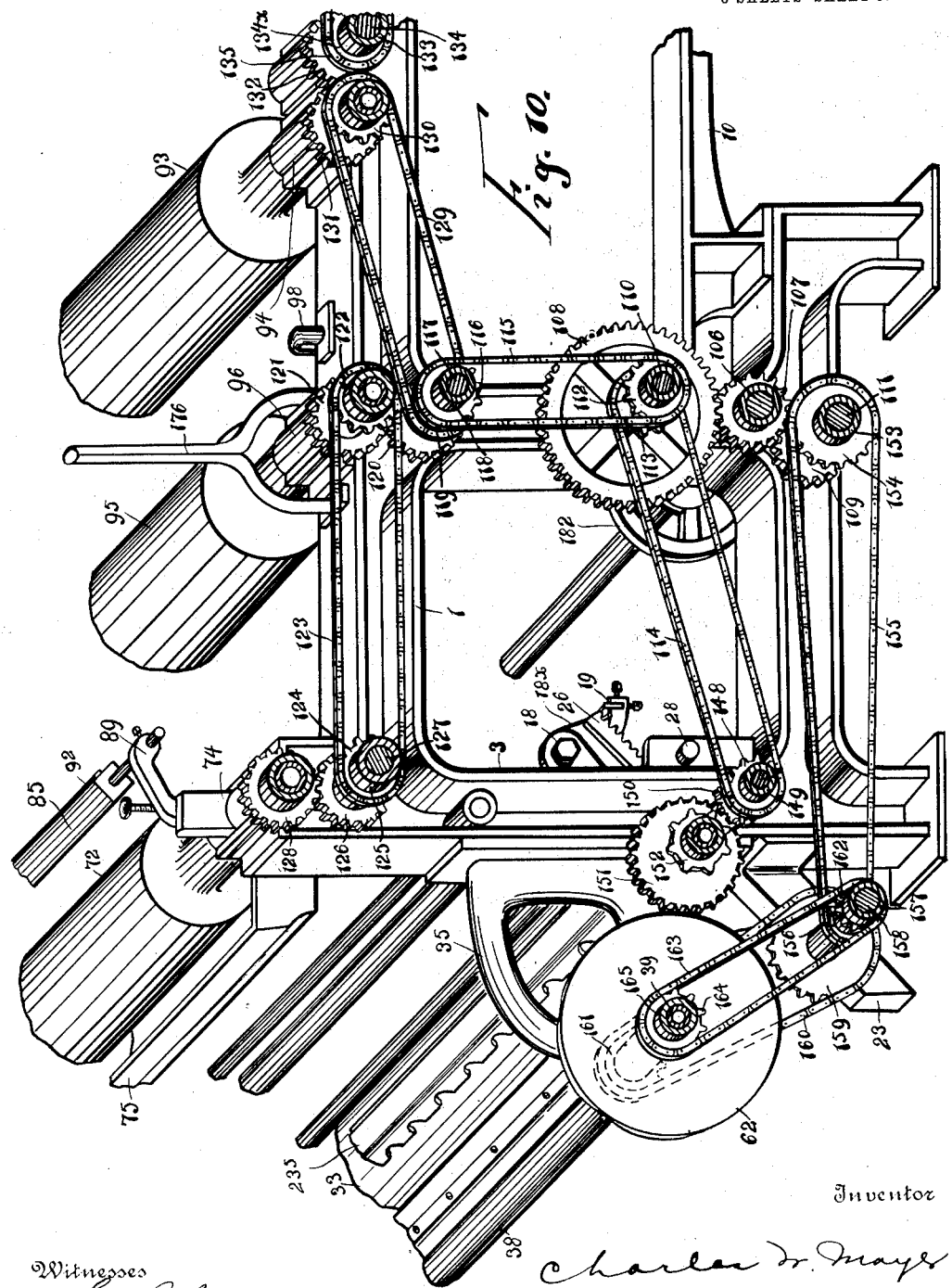

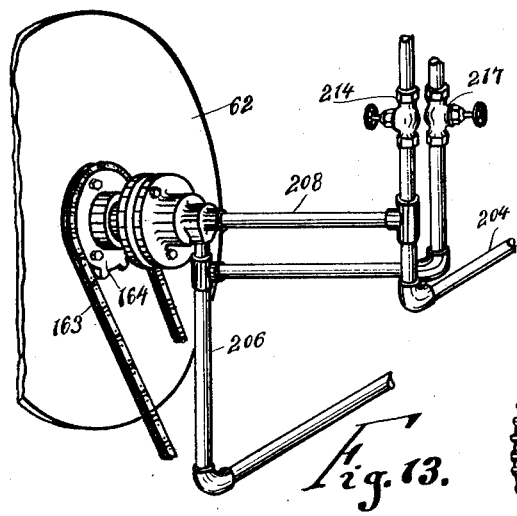
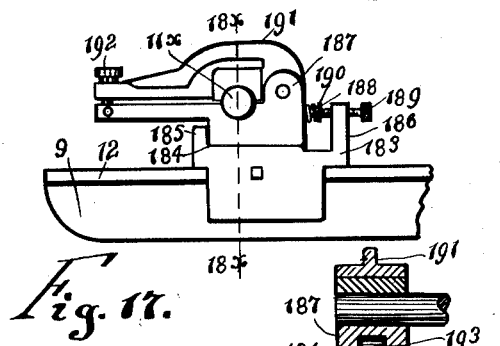
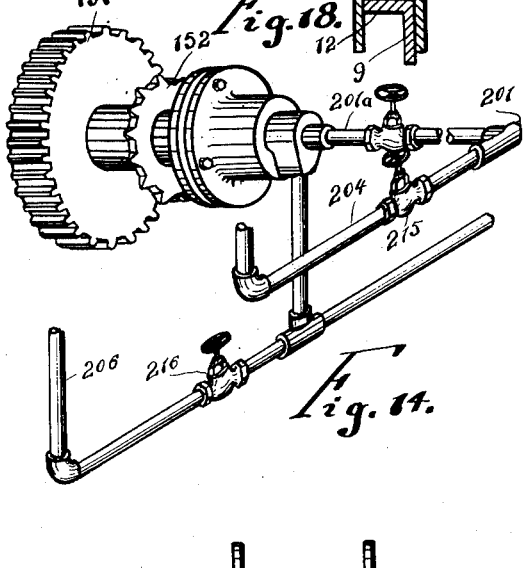
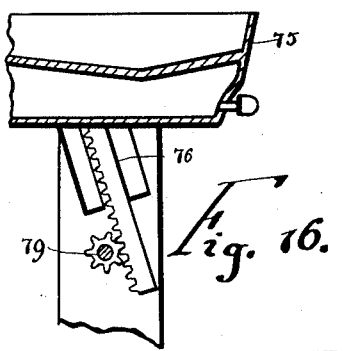
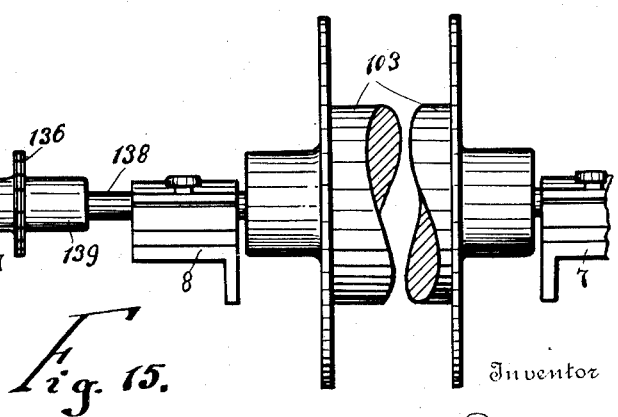

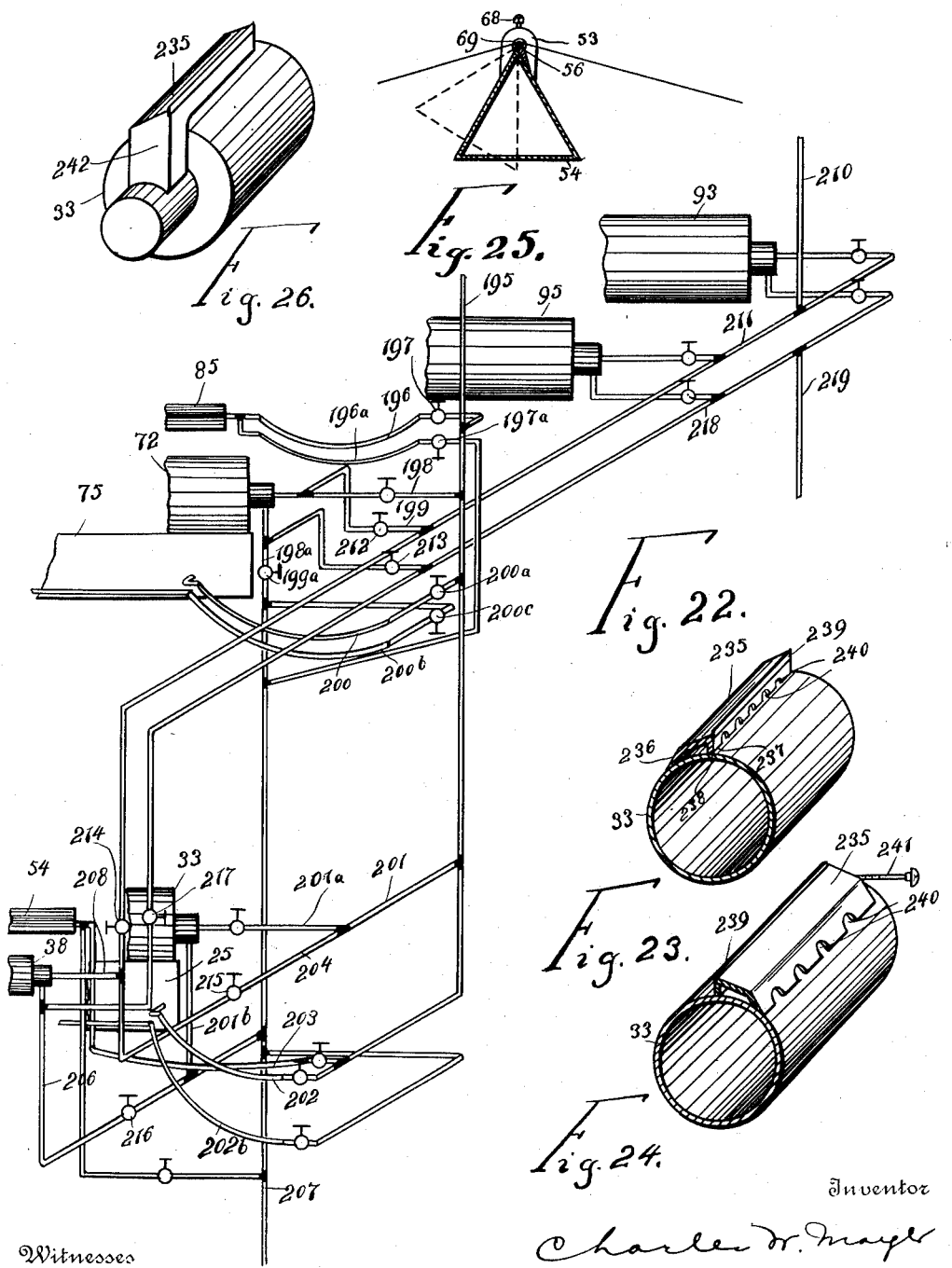

UNITED STATES PATENT OFFICE.

CHARLES W. MAYER, OF ROCHESTER, NEW YORK, ASSIGNOR TO KATHERINE B. MAYER.

COATING-MACHINE.

1,043,021.  Specification of Letters Patent.  Patented Oct. 29, 1912.

Application filed November 24, 1911. Serial No. 662,218.

*To all whom it may concern:*

Be it known that I, CHARLES W. MAYER, a citizen of the United States, residing at Rochester, in the county of Monroe and State of New York, have invented certain new and useful Improvements in Coating-Machines, of which the following is a specification.

The object of this invention is to provide an improved machine for coating carbon paper with either a single or a double coat, or for coating waxed paper or any kind of paper with a size or emulsion, or for coating photographic paper.

Another object of my invention is to provide feeding devices for insuring the uniform feed of the dope or coating material to the paper to which the coat is being applied.

Another object of my invention is to provide equalizing devices for the purpose of laying smoothly the coat on the paper.

Another object of my invention is to regulate the feeding devices so as to give the surface of the paper when coated a wave-like appearance.

Another object of my invention is to so construct the machine that all the gearing and all the piping in connection therewith is confined to one side of the machine.

Another object of my invention is to so arrange the feeding rolls of the machine to cause them to draw the paper through the machine under whatever tension may be necessary to insure the feed and wind it lightly on the receiving drum.

These and other features of my invention will be fully illustrated in the drawings, set forth in the specification and pointed out in the claims at the end thereof.

Figure 6:
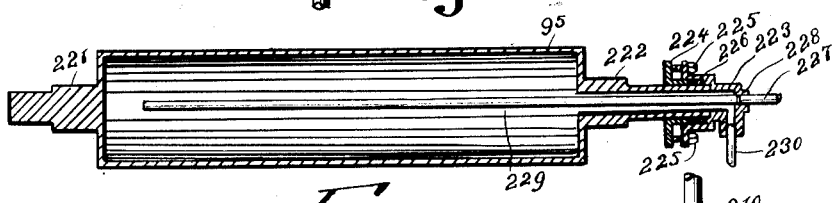
Figure 7:
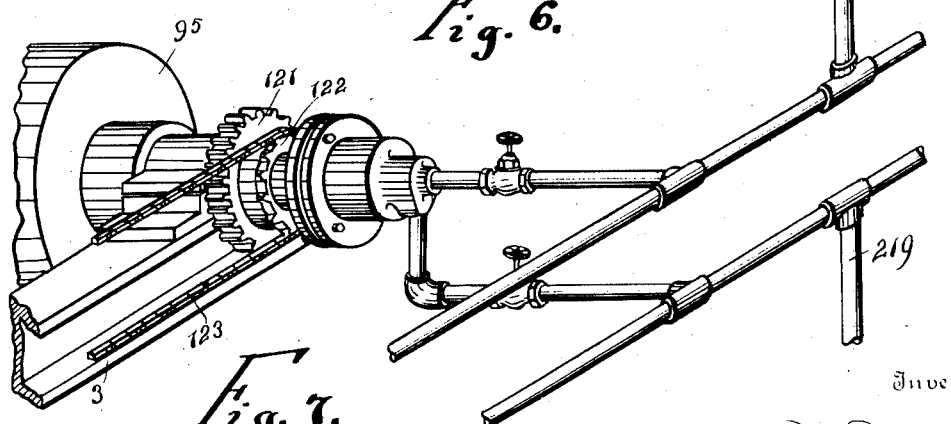

In the accompanying drawings, Figure 1 represents a front elevation of my improved coating machine. Fig. 2 is a side elevation on the right hand side of Fig. 1. Fig. 3 is a side elevation on the left hand side of Fig. 1. Fig. 4 is a sectional view on the line $4^x$—$4^x$ of Fig. 1. Fig. $4^A$ is a sectional view of a portion of the machine on the same section line, showing a modification of the machine for coating paper on both sides. Fig. 5 is a perspective view of the upper coating roll and the pipe connections therewith. Fig. 6 is a vertical longitudinal sectional view through one of the coating or cooling rolls. Fig. 7 is a perspective view of one of the cooling rolls, with the gearing and pipe connection therewith. Fig. 8 is a detail view of the wire bound equalizing or jigging roll. Fig. 9 is a perspective view of the jigging rod and carrier and operating mechanism therefor. Fig. 10 is a perspective view of the gearing of the machine. Fig. 11 is a detail view of a portion of the adjusting mechanism for the upper scraping roll and the parts connected thereto. Fig. 12 is a perspective view of the adjustment for the equalizing bar and the parts associated therewith. Fig. 13 is a perspective view of the cam for jigging, the equalizing rod and the gearing for driving the first cooling roller, and the pipe connections therewith. Fig. 14 is a detail perspective view of the pipe connections and gearing for the lower coating roll. Fig. 15 is a detail view of the clutch for driving the winding drum. Fig. 16 is a detail view of the mechanism for elevating and lowering the dope pans. Fig. 17 is a side elevation of the support for the feed roll and the sliding mount therefor. Fig. 18 is a section on the line $18^x$—$18^x$ in Fig. 17. Fig. 19 is a detail perspective view of the bearing 36. Fig. 20 is a detail perspective view of the bearing 170. Fig. 21 is a detail view of a portion of the jigging apparatus. Fig. 22 is a diagrammatic perspective view of the steam and cold water piping and the various rollers, dope pans and other parts to which such piping is connected, all gearing and other unnecessary parts being omitted for the purpose of making the diagram clearer. Figs. 23 and 24 are detail perspective views of the scraper by which the excess of dope is removed from the paper immediately after it leaves the coating roll, this scraper being a substitute for the scraper and jigger illustrated in Fig. 9. Fig. 25 is a modification of the tube 54 shown in Fig. 9, in which the tube is shown triangular in cross section rather than rectangular. Fig. 26 is a detail perspective view of a modification of the scraping shoe and the support therefor. Fig. 27 is a detail perspective view of the supporting bracket $18^x$, showing a modified form thereof.

In the accompanying drawings like reference numerals refer to like parts.

In the drawings reference numeral 1 indicates the frame of the machine on which all of the parts are mounted. This frame is made up of side members 2 and 3, held together by the bolts and braces 4, 5 and 6.

At the top of the frame are fastened by bolts or other devices the brackets 7 and 8 and at the bottom of the frame are fastened the brackets 9 and 10. All of the foregoing parts are stationary and are designed to give a rigid support to all the parts contained in the machine.

On the bracket 9 is supported the supply roll 11, on which is carried the paper that is drawn on the machine to which the coat is being applied, as illustrated in Fig. 4. The supports 9 and 10 are provided with the guides 12 and 13 on which the supply rollers can be adjusted forward and back and to also permit the placing thereon of a second supply roll 14 for a purpose that will presently be explained.

Mounted on the frame are the adjustable arms 15 and 16, between which is suspended a bar 17 which is adapted to support the web of paper in its travel from the supply roll to the coating roll. Mounted on the frame is the arm 18 on which is carried the bracket or plate 18$^x$ that carries the bars 19, 20, 21 and 22, around which the paper travels in the serpentine path illustrated in Fig. 4, the bars 19 and 22 being rectangular in cross section and being provided with square corners for the purpose of smoothing the paper and directing it in its path to the coating roll, the bars 20 and 21 being round. These square corners on the bars 19 and 22 are made sharp and the sides of the bars leading up to these corners are smooth and polished. Thus the thin, delicate paper web as it is drawn under tension from the supply roll over these corners is thoroughly and effectively ironed out and this action is effective for this purpose and to prevent wrinkling as well, no matter how thin and fragile the paper may be. It will thus be understood that the bars 19 and 22 with their sharp square corners are not merely tension strips, but that in connection with the tensioned feed of the paper, they serve a peculiar and special purpose in a machine of this character, in that they are adapted to insure the even and accurate presentation of the delicate stock, such as very light onion skin paper, to the dope roll in a manner to insure an even and perfect application of the dope to the paper stock. The arms 18 are clamped to the frame in any angular position desired by the studs on which they are pivoted. The brackets 18$^x$ are held from swinging on the arms 18 by the set screws 18$^y$ and by the set screws, can be held in any angular position. Raising or lowering the brackets 18$^x$ will vary the contact between the paper web and the coating roll 33. Changing the angular position of the brackets 18$^x$, will increase the straightening and stretching effect on the paper. Mounted on the frame are also provided the guides 23 and 24 in which the dope pan 25 and the parts associated therewith are supported. Attached to either side of this dope pan are the rack bars 26 and 27 by which the dope pan may be raised and lowered, as will now be explained.

Mounted to rotate in suitable bearings provided in the frame of the machine is the shaft 28 having a pinion 29 thereon which meshes with the rack on the rack bar 26. On the end of the shaft 28 is provided a ratchet wheel 30 which is engaged with a pawl 31 mounted on the frame of the machine, by which the shaft is held from backward rotation. The end of the shaft has a pin 32 therethrough to which a crank may be applied for the purpose of turning the shaft either up or down. Also mounted to rotate in the frame of the machine is the coating roll 33, which roll makes contact with the liquid dope in the dope pan 25 on the one side and the web of paper that is being fed through on the other side. Also mounted in the frame of the machine are the brackets 34 and 35 on which are carried the boxes 36 and 37, in which boxes are mounted to rotate the cooling roller 38 which has reduced ends on each end, that on the left hand end being shown at 39 in Fig. 3. This box is composed of a base plate 40 having a cylinder 41 cast integrally thereon at one end thereof and being left half round at the other end where the bearing is closed by the cover plate 42. Pivotally mounted to oscillate upon the cylindrical part 41 of the bearing is the arm 44, which arm at its forward end terminates in a fork or yoke in which is swiveled a block 45, which block is perforated and threaded to receive the adjusting stem 46 therein, which stem bears against a lug 47 cast integral with the bracket 34, by which the bracket 44 may be raised and lowered or oscillated around the bearing 41 above described.

On the opposite side of the machine is mounted in the same manner the swinging arm 48 which can be raised and lowered by the stem 49. These swinging arms can be adjusted independently of each other, raising the square tube 54 at either end so that it will bear evenly against the web of paper even when the paper runs unevenly, for the purpose of taking up any slack or irregularity therein caused thereby.

The arm 44 is provided with a lug 50 integral therewith which lug is perforated and in which is supported the sleeve 50$^A$ through which the rod 56 can be removed and in which the left hand end of the rod 56 normally rests. Connected to the lug 51 on the arm 48 is the hanger 57, which hanger is provided with two lugs 58 and 59 for the purpose of making a rigid attachment with the arm 48. Mounted to slide in the hanger 57 is the fork 60 on the end of which is mounted a roller 61. This roller bears normally against the cam wheel 62, the fork with its roller being held forward in engagement with the wheel by the compression spring 63 which bears against the shoulder 64 on the fork at one end and the shoulder 65 on the hanger 57 at the other end. The cylindrical end 66 of the fork 60 is surrounded by a tube 69 which rests in the shoulder 65 and on which the hanger 53 is pivotally mounted and to which it may be rigidly fastened by means of the set screw 68, by means of which the tube 54 may be given any angular adjustment. The fork 60 has a square shank at 64 which fits in a square opening in the hanger 57 and by which the rotation of the fork 60 is prevented.

Connected to the hangers 52 and 53 is the square tube 54. Fastened to this square tube 54 in any suitable manner is the bar 55, between which bar and the adjacent side of the square tube is left a groove in which the equalizing bar 56 rests. This equalizing bar is in line or concentric with the sleeve 50$^A$ and the fork 60 on the hangers 52 and 53, by which the square tube 54 is supported.

As shown in Fig. 8, the equalizing bar 56 has a male thread 70 on the end thereof which engages with the female thread provided in the cylindrical end 66 in the fork 60, so that the fork 60 and the equalizing bar 56 may be moved together longitudinally. The square tube 54 and the bar 55 are so mounted that the recess between them will receive and bear against the equalizing bar 56 for a purpose that will presently be explained.

Mounted to rotate in the frame of the machine at the top is the upper coating roll 72, which roll is shown in section in Fig. 4. This roll has reduced ends which are mounted to rotate in the bearings 73 and 74. Below this coating roll is mounted the dope pan 75 to which dope pan is fastened the rack bars 76 and 77. Mounted in the frame of the machine is the shaft 78 which carries the pinions 79 and 80 which engage with the racks 76 and 77 for the purpose of raising and lowering the dope pan. Suitable guides are provided in which the racks 76 and 77 travel as they are raised and lowered. The end of the shaft 80 is provided with a ratchet 81 which is engaged by a pawl 82 to normally prevent backward rotation. The end of the shaft 78 is provided with a cross pin to which a crank may be applied for the purpose of turning the shaft so that the dope pan may be raised and lowered.

It will be understood that the normal position of the dope pans for coating is that shown in Fig. 4, in which the coating rollers are partly immersed in the coating solution that is contained in the pans, and when the pan is not in use the pan may be lowered so that the coating roll will not make contact with the dope in the pan, in which case the coating roll can be used as a cooling roll. The top of the bearing 73 is provided with a flange 83 on which is pivotally mounted the arm 84, which arm is provided with a bearing for the tube 85. The arm 84 is provided with a block 86 swiveled thereon in which a screw 87 works against a lug 88, by which the arm 84 may be raised and lowered. A similar arm 89 is mounted in the same way on the far side of the machine, a screw 80 being used to raise and lower it. Between these arms the tube 85 is mounted, this roller being held rigidly in the arms by means of the set screws 91. On top of the tube 85 is provided the rod 92 which may be smooth or wire wound, as will be hereinafter described. Instead of the tube 85 may be substituted at this place a square tube similar to that shown at 54, the rod and the tube forming a device for taking the excess coating off of the paper and returning it to the dope pan. Also mounted in the frame of the machine is the cooling roller 93, a suitable bearing 94 being provided therefor on each side of the machine. Between the roller 93 and the roller 72 is mounted the roller 95 for which bearings 96 are provided on the frame of the machine. Mounted on the frame of the machine are the hangers 97 and 98 in which is mounted the roller 99. Similar hangers 100 and 101 are mounted on the frame at the rear, which carry the roller 102. At the rear of the frame in suitable bearings is supported the roller 103 on which the paper is received after the manufacture of it is completed.

As illustrated in Fig. 4, the path of the paper is from the supply roll 11 over the bar 17, over the edge 19, around the round bars 20 and 21 and under the edge 22, over the coating roller 33, then over an equalizing bar 56, then under the cooling roller 38, over the coating roller 72, around the cooling rollers 93 and 95 and then over the roller 99 and under the roller 102, to the reel 103. When the machine is used for coating paper on one side the coating roller 33 and the square tube 54 are heated, preferably by steam, while all the other rolls in the machine are cooled by the circulation of cold water through them or are left of neutral temperature.

When the machine is used for coating both sides of the paper, the coating roller 33 and the square tube 54, the roll 38, the coating roll 72 and the tube 85 are heated, the remainder of the rolls being cooled or left of neutral temperature.

The operation of the machine may be varied. For example, in coating the paper on one side the roller 33 and the square tube 45 may be run hot and the roller 38 and the roller 72 may also be run hot, leaving the paper to cool gradually as it passes under the fan 104, it being my experience that when the paper is chilled quickly by keeping the roller 38 cold, a gloss surface will be left on the paper, while if the paper is kept warm for a considerable period of time the solution will soak into the paper and more thoroughly impregnate it and when dry it will have a dead finish instead.

It will be understood that the special and precise relative positions of the dope roll 33, the equalizing bar 56 and the releveling or smoothing roll 38, is of special importance in a machine of the present type. The coated paper, while still hot from the coating roll, passes immediately and directly to the equalizing bar without coming in contact with any other object, and by the special construction of this bar with its very finely threaded periphery, the coating is evenly and properly distributed and caused to impregnate the paper to the required extent. Then before the paper with its coating has time to chill, it is brought into engagement with the smoothing roll 38, which acts on it to produce the desired surface, this roll being adapted when heated to re-fluidify the carbon coating to an extent causing it to settle itself into a smooth even surface and causing the wax to be better absorbed into the fiber of the paper; when cold this roll acts to chill the paper and produces a glossy effect on the coating. The special construction of the equalizer 56 is of particular importance in a machine of the present type, for the reason that I have found in practice that a finely threaded bar with its active face formed as an arc of very small radius is the only type well adapted for evenly coating fine tissue paper with carbon and other light substances. The paper thus coming in contact with such a surface, there is provided a V-shaped space immediately in front of the equalizer with a gradual separation behind it, so that a certain suction effect is produced, without in any way endangering the paper, which effect is not otherwise attainable. I have found that the only practicable way of producing an equalizing bar with a sufficiently finely threaded formation is to wind a small bar or rod with very fine wire. The circular bar thus formed is further advantageous in that it enables the active portions thereof to be renewed as desired by turning the bar and this turning also clears away foreign matter such as lint, threads, etc., which may be in the dope and cling to the bar. The position of the smoothing roll 38 close to the equalizing bar and to the dope roll is important, whether the roll 38 be run hot for annealing the paper or cold for chilling it to produce a gloss surface, since in either case it is necessary that this roll act on the paper before its chilling from contact with the atmosphere commences. After such chilling begins, the coating cannot thereafter be releveled and smoothed to make a perfect coat. The special relation of the front roll 38 in connection with the second dope roll 72, is also of particular importance, for the reason that while this front roll coöperates to properly hold the paper against the first dope roll 33, it is also diagonally positioned beneath and in front of the second dope roll 72, thus presenting the stretch of paper web between the small front roll 38 and the second dope roll 72 in position where it is most convenient for inspection by the operator. I also consider the arrangement whereby the paper web, after passing over the second dope roll 72, is caused to travel back in a direction opposite to that of its initial feed, as of special importance, the winding-on roll being thus positioned adjacent the initial supply roll, so that both these are convenient for inspection and manipulation from one end of the machine, while the web portion being treated is freely exposed without any obstruction at the other end of the machine. The relative positions of the second dope roll 72 and the two power driven cold rolls 93, 95 which effect the paper feed is also of importance, in that the first cold roll 95 being positioned with its top beneath the paper web as stretched from the top of roll 72 to the top of roll 93, permits a long stretch of the paper to be exposed to the atmosphere before coming in contact with the roll 93, so that it is by this time chilled and dry; this chilling being furthered by the fact that the web passes in proximity to the cold roll 95, though it does not touch the same in passing to the roll 93. I am aware that the arrangement of the rolls for effecting this result in substance, could be varied, and I therefore desire the present form to be considered as illustrative and not restrictive, the essential point being that the rolls are so positioned that the paper first comes in contact with the rear cold roll 93 after being coated by the roll 72 after a sufficient lapse of time so that it will be thoroughly chilled and hardened. By reason of the fact that the tension required for pulling the paper through the machine is provided by the rolls 93, 95, the winding-on roll 103 is substantially relieved of tension, being driven by a relatively light friction power, just sufficient to properly wind on the paper. This provision, as well as that of the small idlers 99, 102, is of importance in that as the paper is usually more heavily coated at the edges than at the central portion, it would be caused to split and tear around the edges after being partly wound on the winding arm roll or reel 103 if this were depended on to draw the paper through the machine. The idlers 99, 102 coöperate to effect a final smoothing out of the paper from both sides, so that curling thereof at the edges just before it is wound on, as would be the case especially when it is coated only on one side, is avoided. The direction in which the paper travels through the machine, i. e. from the supply roll at the left hand end around to the dope rolls, and other operative parts at the right hand end, as seen in Fig. 4, and thence up over the second dope roll and back in an opposite direction to near its starting point, is of importance and largely contributes to convenient and expeditious operation.

It will also be understood that when the machine is being used for coating both sides of the paper the tube 85 will be placed in the position shown in Fig. 4^A, the tube 85 or its rod 92 being then kept in contact with the paper, while as shown in Fig. 4 it is left out of contact with the paper.

I will now describe the gearing by which the various parts of my machine are driven for the purpose of making them rotate at the correct angular velocity and peripheral velocity to cause each part to have its proper effect on the paper and in the machine as a whole.

Mounted on the frame of the machine is the main driving pulley 105, which driving pulley may be driven by a belt from any suitable source of power. This driving pulley at normal speed will be driven about 75 R. P. M. This driving pulley is keyed to the shaft 106 on which is keyed a gear 107. This gear in turn meshes with the gears 108 and 109. The shaft 106 extends from one side of the machine to the other, being journaled in both of the frames 2 and 3. A gear 108 is keyed to the shaft 110 which is mounted to rotate in a suitable bearing in the frame 3. A gear 109 is mounted on a sleeve 153 which is mounted to rotate on a stud 111 carried in the frame 3.

Keyed to the shaft 110 are the sprocket wheels 112 and 113. The sprocket wheel 112 engages with and drives the sprocket chain 115 and the sprocket wheel 113 engages with and drives the sprocket chain 114. The sprocket chain 115 in turn engages with the sprocket wheel 116 keyed to the sleeve 118, journaled to rotate on the pin 117, which pin is mounted in the frame 3. On this sleeve 118 is also keyed a sprocket wheel 119 and a gear wheel 120. The gear wheel 120 meshes with a pinion 121 which is keyed to the roller 95 and by which the roller 95 is driven. Keyed to the pinion 121 is a sprocket wheel 122 which engages with a sprocket chain 123 which in turn engages with and drives the sprocket wheel 124 which is keyed to a sleeve 125, on which is also mounted the pinion 126, this sprocket wheel, sleeve and pinion rotating on a pin 127 mounted rigidly in the frame 3. The pinion 126 meshes with and drives a pinion 128 which is keyed to the upper coating roller 72, by which the upper coating roller is driven. Engaging with the sprocket wheel 119 is the sprocket chain 129 which engages with the sprocket wheel 130 which is keyed to the roller 93. Also keyed thereto is the pinion 131 which meshes with the pinion 132 mounted on the sleeve 133, which sleeve is mounted to rotate upon a pin or stud 134 mounted in the frame 3 of the machine.

Keyed to the sleeve 133 is the sprocket wheel 134^x which is engaged by a sprocket chain 135 which engages with a sprocket wheel 136 mounted on the sleeve 137, which sleeve is mounted to rotate loosely on the shaft 138, to which shaft is keyed the winding drum 103 on which the finished paper is wound up. The sleeve 137 carries a disk 140, which together with the disk 141 forms a disk clutch. The disk 141 has a screw 142 which engages with a slot shown in dotted lines at 143 in Fig. 15, by which a limited endwise movement is permitted to the disk 141. The end of the shaft 138 is threaded at 144 and a nut 145 is provided thereon, between which nut and the sleeve 146 which carries the disk 141, is provided a compression spring 147 by which the frictional engagement between the disks 140 and 141 can be regulated. The spring 147 presses the sleeves 146 and 137 to the right against a collar 139, which forms a thrust bearing therefor, by which parts the shaft 138 is driven with a torque that can be regulated according to the needs of the machine and the conditions under which it is working. By means of this clutch either light or moderate or very heavy tension may be applied to the paper as it is being wound up on the reel. Ordinarily it is preferred that the tension on the paper at this point be very light, only enough to make the rolls 93 and 95 take a good grip on the paper for the purpose of drawing it past the preceding rolls of the machine. If the tension on the paper is light at this point it will be wound up loosely on the reel instead of being wound up tight thereon. This will of course cause the paper to be kept in better condition.

The sprocket chain 114 engages with and drives the sprocket wheel 148. This sprocket wheel 148 is keyed to the sleeve 149 which carries thereon the pinion 150, which pinion engages with and drives the gear wheel 151 which is keyed to the lower coating roller 33 and by which this roller is driven. Keyed to this roller is also provided the sprocket wheel 152, which sprocket wheel runs idle and useless when the machine is used for coating one side of the paper. When however the machine is used for coating both sides of the paper the sprocket chain 123 is detached from the sprocket wheel 122 and is connected to the sprocket wheel 152, so that both of the coating rolls 33 and 72 may be driven in unison with the same angular and peripheral velocity.

The pinion 109 is mounted on the sleeve 153, with which it revolves in unison. On this sleeve is also mounted the sprocket 154 with which engages the sprocket chain 155, which in turn drives the sprocket wheel 156, which sprocket wheel is mounted on the sleeve 157, which sleeve is mounted to rotate on the pin or stud 158. Also mounted on this sleeve is the sprocket wheel 159 which engages with the sprocket chain 160, which in turn is connected to the sprocket wheel 161 which drives the cam wheel 62. Also mounted on the sleeve 157 is the sprocket wheel 162 which engages the sprocket chain 163, which in turn engages with the sprocket wheel 164 which is carried on a sleeve 165 which is keyed to the reduced end 39 of the cooling roller 38.

From the foregoing explanation it will be understood how the machine is constructed and operated and how the paper travels through the machine. An explanation of the angular and peripheral velocities of the various rotating parts with which the paper comes in contact will now be given.

For single coated paper the reel 11, rollers 20 and 21, rolls 93 and 95 travel at the same rate as the paper. Roll 72 travels slightly faster than the paper. Roll 33 travels at about one-fifth of the rate of the paper. Roll 38 travels about 10 per cent. faster than the paper.

For double coated paper these same velocities would be observed except that the roll 72 has then to be geared as above explained so as to travel at the same angular and peripheral velocity as the roll 33.

It will be understood of course that the coating rolls are of the same diameter but if made of different diameters the gearing would be changed so as to secure the same peripheral velocity. In ordinary practice the driving shaft 106 of the machine is intended to rotate at about 75 R. P. M., the rolls 93 and 95 at about 25 R. P. M., the roll 72 at about 29 R. P. M. The rolls 93 and 95 are preferably nine inches in diameter and the rolls 72 and 33 eight inches in diameter. The roll 38 is about two and one-half inches in diameter. The cam wheel 62 rotates at the rate of 375 R. P. M. This cam wheel has four elevations and four depressions arranged alternately on the base thereof, as indicated in end elevation in Fig. 1. The difference between the elevations and depressions is about a quarter of an inch and as the roller on the fork 60 is held up against the cam wheel 62 it may be moved forward and back four times for each complete revolution of the cam wheel, making the fork 60 and the equalizing rod 56 attached thereto vibrate back and forth at the rate of 1,500 vibrations per minute. These vibrations occur while the paper is passing over the equalizing rod 56. By this longitudinal vibration the equalizing rod marks the paper in its coating with uniform wavelike marks, which gives to the paper a very attractive appearance, and assists in spreading the dope more evenly when made of a heavy or thick consistency. This equalizing rod is one of the important features of my invention and I will now describe the construction and use of it.

The jigging rod is preferably of smooth cylindrical steel stock three-sixteenths of an inch in diameter, made slightly longer than the width of the paper that is intended to be jigged thereby. This rod is wound helically from one end to the other with steel wire from four- to eight-thousandths of an inch in diameter, this wire being preferably wound on close and tight. The wire must be free from kinks or knots or splices or uneven places of any sort and must run continuous in a single piece from one end of the jigging rod to the other, in order to secure the best results. Jigging rods of larger diameter may be used and wire of larger diameter wound thereon. By increasing the diameter of the rod and the diameter of the wire, the thickness of the coat that is left on the paper may be increased, while by decreasing the size of the jigging rod and decreasing the size of the wire, the coat which is left on the paper that passes over the jigging rod is correspondingly diminished. It will be understood that the jigging rod wound in this way is a device for removing the excess of coat from the paper. When the paper travels over the coating roll it takes from the coating roll a certain amount of the dope that is raised from the dope pan by the coating roll, and this dope may be on the paper somewhat unevenly distributed. The jigging rod removes this excess from the paper and returns it to the dope pan, the amount removed and consequently the thickness of the layer of coating left depending principally on the size of the wire with which the equalizing rod is wound. The square tube 54 is used with flat sides because it facilitates the return of the surplus dope from the jigging rod to the pan while a round tube would permit the material to accumulate thereon more than it would accumulate on the square tube. The tube 54 may be of diamond shape and if desired only the upper half of it may be used. The jigging rod is reciprocated only when the wavelike appearance is desired on the paper. Otherwise the jigging rod will be allowed to remain stationary. The effect in removing the surplus coat from the paper is the same in either case.

Instead of having the jigging or equalizing rod made up of a rod wrapped with wire, it may be made of a rod on which a very light thread is cut, of substantially the same width as the diameter of the wire and approximately the depths of the radius of the wire.

To facilitate the removal of the reel 103 from the machine I provide a special bearing 170 for the shaft 138 thereof. This bearing consists of a base 171 having a block 172 pivoted to the top thereof, the end of which block is forked at 173, which can be engaged by the latch 174 by which it is held securely in position around the shaft 138. The bearing can be opened and the block 172 placed in the position shown in Fig. 20. The reel 103 can be lifted out of the base 170 and placed in the block 172, which will cause the sprocket chain 135 by which it is driven to hang limp so that it can be removed from the sprocket wheel 134 by which it is driven and then removed from the sprocket wheel on the reel. The reel can then be removed from the machine and an empty reel can be put in the machine in its place on the block 173, after which the sprocket chain can be connected up between the sprocket wheel 134 and the sprocket wheel on the fresh reel, after which the shaft 138 can be placed in the base 170 and the bearing can be closed and locked. Each reel is preferably provided with its own clutch, sprocket wheel and various other parts such as are illustrated in Fig. 15.

For the purpose of air cooling the paper I provide a fan 175. This fan is mounted on the bracket 176 which is attached to the frame of the machine in any suitable manner, as illustrated in Figs. 1 and 3. This frame is provided with pulleys 177 and 178 over which a belt 179 travels to a pulley 180 mounted on the shaft 181, which shaft is mounted to run in a bearing in the end of the bracket 176, at the lower end of which shaft is keyed the fan 175. The belt 179 is driven by the pulley 182 carried on the main driving shaft 106 of the machine. The fan is so placed as to deliver a descending current of air on the paper as it passes from the roll 72 to the roll 93. This fan is preferably used only when the paper is being coated on both sides. I have also provided a special bearing for the supply rolls, which bearing is illustrated in Figs. 17 and 18. Mounted on the bracket 9 is the base 183 having a guide 184 formed therein with the uprights 185 and 186 at the ends thereof. On this guide is mounted to slide the base 187, which base is held to the left in position by a compression spring 188. This spring is contained in the cylindrical recess in the base 187 and is compressed by a stud 189 which has a collar 190 formed near the end thereof, between which collar and the base 187 the spring 190 is compressed. The degree of compression may be varied by turning the stud 189 which is threaded and works in the upright 186. Pivotally mounted on the base 187 is the block 191 which is forked and held down at its forward end by the latch 192. Between the base and the block is provided a bearing $11^x$ for the shaft, which carries the reel 11. This shaft snugly fits the paper reel and has such a frictional engagement therewith as to revolve integral therewith. The adjustable mounting of the block 191 which bears on the shaft $11^x$ is to throw a sufficient uniform drag thereon to retard the unwinding of the reel. It will be seen that the parts 187 and 191 may be moved longitudinally along the guide 184 compressing the spring 188. This is to permit the supply roll to yield in case for any reason the supply roll has become stuck or the machine should pull too hard on the web of paper, thus the tearing of the paper will be avoided. This also permits the roll to accommodate itself to paper of irregular or uneven shape.

If desired the guides 184 and the bases 187 may be suitably recessed and separated by rollers 193, as illustrated in cross section in Fig. 18.

As illustrated in Fig. 3, two supply rolls may be placed on the machine at the same time. In such case, the supply roll 11 at the right in Fig. 11 will be used to furnish paper that is being coated, while the supply roll at the left in Fig. 11 will be used to furnish a wrapping sheet that will be wound up with the finished paper, thus keeping the coated surfaces apart on the reel 103.

For the purpose of evenly applying the dope to the paper and fixing it thereon, it is necessary to heat some of the rollers with which the paper comes in contact, and cool certain others of the rollers. The rollers are preferably heated by steam and cooled by water, and the arrangement by which the steam and the water is conveyed into and out of the rollers will now be described.

When the machine is used for making single coated carbon paper, the roller 33 and the square tube 54 are heated and the rollers 38, 72, 93 and 95 are cooled. This will produce carbon paper such as is ordinarily known to the trade as non-smut, hard finish paper.

When making annealed carbon paper, which is a paper coated on one side, and when making double coated carbon paper, the roller 33, square tube 54 and the rollers 38 and 72 are run hot.

When double coated paper is being made, the tube 85 will be placed in the position indicated in Fig. 4ᴬ and the tube 122

85 will then be heated. When making double coated or annealed paper, the cooling of the paper will be confined entirely to the fan 175 and the rollers 93 and 95. The annealed paper referred to above is a paper in which the wax and oils that constitute a part of the dope are dried into and absorbed by the fibers of the paper by the re-heating of the paper when it passes over the rolls 38 and 72. This produces a softer and drier surface of the pigments, which surface is a dead finish and not a polished surface. The rollers 33, 38, 72, 93 and 95 rotate while the tubes 54 and 85 are stationary.

The steam pipe 195 supplies the pipe 196, through which steam is fed to the square tube 85, the supply of which steam is controlled by the valve 197. The tube 85 is drained by the tube 196$^a$, controlled by the valve 197$^a$. The pipe 195 also feeds steam through the tube 198 to the roll 72, which supply is controlled by the valve 199. This roll is drained by the pipe 198$^a$, which pipe is controlled by the valve 199$^a$. The pipe 195 also supplies steam through the pipe 200 to the upper dope pan 75, which pipe is controlled by the valve 200$^a$. This dope pan is drained by the tube 200$^b$, controlled by the valve 200$^c$. All of these connections are illustrated in perspective in Figs. 5 and 22. The pipe 195 also feeds through the pipes 201 and 201$^a$ to the roller 33, which roller is drained by the pipe 201$^b$, and through the tube 202 to the dope pan 25, which dope pan is drained by the tube 202$^b$. The pipe 195 also feeds through the tube 203 to the square tube 54. The pipe 201 feeds steam through the pipe 204 and the pipe 208 to the roll 38, which roll is drained by the pipe 206. As shown in Figs. 1 and 5, the tube that supplies the live steam to the steam chamber of the dope pan taps into the pan on the right hand side and the pipe that drains the pan taps into the pan at the left hand side. This facilitates the circulation in the steam chamber and maintains a more uniform heat therein.

The connections for the dope pans 25 and 75 and for the tubes 85 and 54 are flexible, so as to permit the vertical adjustment of them and still maintain the connection with the steam pipe.

The square tube 54 drains through the tube 205, shown in Fig. 3, the drainage from all of the other rolls being from the side of the machine shown in Figs. 2 and 22, although if desired the tube 54 can be drained from the side of the machine shown in Figs. 2 and 22 as well, it being considered desirable to confine the gearing and the piping of the machine to one side of the machine, leaving the side shown in Fig. 3 free for inspection and access by the operator.

The tube 207 is the drainage tube for all the steam heated parts in the machine, and as shown in Fig. 22, valves are placed between the steam supply pipe and each of the parts of the machine that are heated by steam, and between each of said parts and the tube 207, which drains said parts, except the parts between the roller 33 and the drainage tube 207, where the valve may be omitted if desired.

I have also provided my machine with tubes for the purpose of conducting cooling water to and from certain of the parts thereof. The tube 210 is for the purpose of supplying certain parts of the machine with cold water. From this tube the tube 211 conveys cold water through the rollers 93 and 95, and when desired also through the rolls 72 and 38, and if the rolls 72 and 38 must sometimes be steam heated, the various valves are supplied in the lateral pipes by which the flow through said pipes from the steam mains or the water mains may be controlled. It will thus be seen that the piping indicates clearly that by closing the valve 199 and opening the valve 212, steam may be shut off from the roller 72 and water admitted to said roller. When cold water is admitted to the roll 72, the valve 199$^a$ which leads to the steam drain should be closed and the valve 213 which leads to the water drain should be open. When cold water is supplied to the roller 38, the valve 214 should be open and the valve 215 should be closed, and the valve 216 leading to the steam drain should be closed and the valve 217 leading to the water drain 218 should be open, so that the drained water can flow out through the pipe 219. From this it will be seen that the two sets of steam and water supply mains are connected to the various parts with which it is necessary that they should be connected, so that by simply opening and closing combinations of valves, the various parts may be heated or cooled as the operation of the machine may require.

In Fig. 6 I have shown a sectional view of one of the rollers, for example the roller 95, showing the construction by which the water or steam is fed into the roller and by which the drainage is secured without interfering with the rotation of the roller. This roll has at its left hand end a solid steel shaft 221 fastened integral therewith, and at the other end a hollow steel shaft 222, which steel shafts are used to support the roller in the bearings. The bearing at the right hand end includes a stuffing box 223, which includes a flanged collar 224 which can be drawn up into the outer collar by the bolts 225, between which collars and the periphery of the hollow shaft is compressed the packing material 226, making the joint water tight or steam tight.

The end of the stuffing box at 228 is threaded with a choke bore from both sides, and the pipe 229 is secured half way through the end of the stuffing box from the inside, making a tight joint between the end of the stuffing box and both of the sides. The steam or water flows through the tubes 227 and 229 to the far end of the roller 95, from which end it slowly works its way back to the hollow shaft and is taken out of the stuffing box by the tube 230. Similar connections are or may be used at the end of each of the rotating parts, and substantially the same type of connection is used for the stationary parts as well.

In Figs. 23 and 24 I have shown a scraper 235, which scraper is also illustrated in Figs. 4$^A$ and 10. This scraper consists preferably of a cast iron shoe having bearing surfaces at its forward edge 236 and its rear edge 237 bearing against the roller 33. This shoe may be used also in connection with roller 72. The front face of the shoe 238 is practically radial with the roller 33 on which it rests. The shoe carries at its upper edge a scraping device which may consist of a knife or scraping edge 239, which may be either sharp or blunt, or a wire wound rod such as is illustrated at 56 in Fig. 9.

As illustrated in Fig. 4$^A$, the paper leaves the roll 33 tangentially and passes up over the scraping edge 239, by which the excess of material is removed from the paper web. This material runs down the front face 238 of the shoe, back on to the surface of the roller 33. The shoe is cut out with semi-cylindrical perforations 240 along its lower edge both at the front and the rear, through which perforations the dope can pass with the roller back to the dope pan. The paper passes on over the scraping edge 239 under the roller 38 and on to the winding apparatus, as is illustrated in Figs. 4 and 4$^A$.

For some papers it is desirable to make the scraping effect as light as possible, leaving the coating heavy, and this is accomplished by moving the scraping edge back to the right from the position shown in Fig. 4$^A$, which adjustment can be accomplished by the adjusting screws 241 which work in the bracket 18 for the purpose of advancing or retracting the shoe on the roller 33. By working the screws 241 in the reverse direction the shoe may be advanced, causing it to lift the paper from the roller quicker and increasing the scraping effect on the paper so as to reduce the amount of the coating on the surface.

In Fig. 26 I have shown a special form of support for the shoe 235, by which it rests upon the reduced ends or bearings of the cylinder 33 rather than directly on the periphery of the cylinder itself, in which case the shoe 235 is supported by the arms 242 which make contact with the reduced ends of the cylinder. In this case the shoe would be slightly elevated from the cylinder 33 so that the surplus dope could pass thereunder, and the recesses 240 in such case would be unnecessary.

In Fig. 25 I have shown a modification or a substitute for the square tube 54. In this case I have made the tube triangular in cross section instead of rectangular in cross section. The tube in either case carries the bar 55, between which and the tube is supported the jigging rod 56. A cylindrical tube can be used instead of either of these, but it is found to be more desirable to use a tube with flat sides because it increases the freedom with which the excess dope flows away from the paper after it has been detached therefrom, and this desirable effect of the square tube is increased by the triangular tube on account of the increased clearance between the sides of the tube and the paper. Either of these tubes which support the equalizing rod 56 is preferably heated in order to keep the dope hot to facilitate the equal distribution of the dope on the paper and to facilitate the removal of the excess thereof from the paper and the return of it to the dope pan.

An inspection of Fig. 4 shows that the various moving parts of the machine are arranged in substantially two horizontal series with a wide interval between them. This permits the operator of the machine to stand at the rear of the machine adjacent to the supply roll and the winding drum and regulate the feed of the paper through the machine, while at the same time he can watch the paper as it comes off from the roll 38 and keep close track of the character of the product that is being produced. This greatly increases the facility with which the machine can be operated. It will also be noticed that all of the piping by which the various parts of the machine are heated and cooled is arranged on one side of the machine, this piping being shown in diagrammatic form in Fig. 25, which diagrammatic form contains all of the supply pipes and all of the drain pipes that are necessary for this purpose. The drain pipe 205 is shown for the square tube 54 in Fig. 3, but this pipe may be omitted and in its stead the piping may be arranged for even this part as indicated in Fig. 25, confining all of the piping to one side of the machine. It will also be noticed, as illustrated in Fig. 10, that all the gearing by which the machine is driven is confined to one side of the machine, viz. the right hand side, which is the same side on which all of the piping is placed. This leaves the left hand side of the machine open and clear so as to make all the parts readily accessible from that side of the machine, which of course still further increases its utility and efficiency.

This machine is adapted to coat paper that runs as light as three and one-half pounds to the ream of 480 sheets of 20x30 inches each and as high as thirty pounds to the ream, which paper is as heavy as any that is ordinarily coated for any purpose whatever. It is believed however that the machine will coat paper of any thickness that will bend around the rollers. The finest paper coated is approximately about .001 inch thick while the heavier grades of paper can be of any thickness that may be desired. For carbon paper, the paper on which the coating is placed is preferably as thin as can be used in order to increase the number of duplicate copies that can be made therewith at the same time.

In the foregoing description it will be understood that numerous changes can be made in the machine described herewith without departing from the spirit of my invention. The paper can be fed over the rollers where now it is fed under the rollers. Parts can be run inverted from their present position, or the position of the parts can be inverted or changed from right to left. This also applies to the position and use of the equalizing bars and the parts that support them.

All these and many other changes that can easily be made and would naturally suggest themselves on the operation of the machine are believed to be within the spirit and scope of my invention.

Having thus described my invention, what I claim as new and patentable is as follows:

1. A machine for coating paper, comprising means for feeding paper under tension, means for coating the paper as it is fed, an equalizing device adjacent said coating means arranged to receive the paper therefrom before it touches another object, and a roll for releveling and smoothing the paper, arranged to receive the paper web directly from the equalizing device, said roll being arranged adjacent said equalizing device.

2. A machine for coating paper, comprising a coating roll, means for feeding a web of paper thereover, an equalizer arranged adjacent said roll and receiving the paper directly therefrom, and a smoothing roll receiving the paper directly from the equalizer and arranged to coöperate with the coating roll to press the paper against the equalizer.

3. A machine for coating paper, comprising a coating roll, means for feeding a web of paper against the same, an equalizer bar arranged adjacent said coating roll to receive the paper directly therefrom, and a smoothing roll at the front of the machine over which the paper is looped, arranged adjacent said equalizer bar.

4. A paper coating machine, comprising a coating roll, means for feeding the paper thereagainst, an equalizer arranged adjacent said roll receiving the paper directly therefrom, a smoothing roll arranged adjacent said equalizer receiving the paper directly therefrom, and means for heating or cooling said smoothing roll at will.

5. A paper coating machine, comprising a coating roll, means for feeding a paper web against the same, and an equalizer mounted adjacent said roll presenting a curved face of small radius to the paper, and a support for said equalizer having provision for heating the same, the parts being arranged with provision for feeding the paper under tension directly from the coating roll to said equalizer.

6. A paper coating machine, comprising a coating roll, an equalizer arranged adjacent thereto presenting a curved face of small radius to the paper, and a smoothing roll arranged adjacent said equalizer, said parts being arranged to feed the paper under tension directly from the coating roll against the equalizer and thence direct to said smoothing roll.

7. A paper coating machine, comprising a coating roll, an equalizer mounted adjacent thereto, and a smoothing roll mounted adjacent said equalizer, said parts being arranged to feed the paper direct from the coating roll against the equalizer and thence direct to the smoothing roll, and the mounting for the equalizer being adjustable to vary the extent of its projection into the path of the paper.

8. A paper coating machine, comprising a coating roll, an equalizer mounted adjacent thereto, and a smoothing roll mounted adjacent said equalizer, said parts being arranged to feed the paper direct from the coating roll against the equalizer and thence direct to the smoothing roll, said equalizer having an adjustable mounting on swinging arms adapted to vary the angle at which the paper is fed thereto from the coating roll and therefrom to the smoothing roll.

9. A paper coating machine, comprising a coating roll, an ironing device for delivering paper thereto smoothed and free from wrinkles, consisting in a sharp angle edge arranged closely adjacent said roll, and an equalizer bar at the other side of said roll from said ironing device arranged to coöperate to press the paper against the coating roll.

10. A paper coating machine, comprising a coating roll, an ironing device at one side thereof having a sharp angle edge, an equalizer bar at the other side thereof for coöperation with the ironing device to press the paper against said coating roll, means for feeding the paper, and means for moving said coating roll at a different rate of speed from that of the paper.

11. In a paper coating machine, the combination of a straightening and stretching device comprising a pair of brackets, a pair of idle rolls supported between them, a scraping edge on each side of said pair of idle rolls and arranged in a line transverse to said pair of idle rolls, said parts being arranged to cause the paper to pass therethrough in a serpentine path.

12. In a paper coating machine, the combination of a straightening and stretching device comprising a pair of brackets, a pair of idle rolls supported between them, a scraping edge on each side of said pair of idle rolls and arranged in a line transverse to said pair of idle rolls, said parts being arranged to cause the paper to pass therethrough in a serpentine path, the paper first passing over the scraping edge, then approximately half way around each of the rolls and then under the scraping edge.

13. The combination in a paper coating machine of a coating roll, means for causing a paper web adapted to pass over said coating roll, and an equalizing bar adapted to remove the surplus coat from the paper web, said equalizing bar being supported by a hollow tube having flat sides.

14. A paper coating machine, comprising a coating roller, means for feeding a paper web in contact therewith, an equalizing bar adjacent said roller in position to receive the paper directly therefrom before it contacts with another body, and means for adjusting said bar to vary its relation to the coating roller.

15. A paper coating machine, comprising a coating roll, means for feeding a web of paper in contact therewith, an equalizing bar arranged adjacent said coating roll to receive the paper directly therefrom before it contacts with another body, a smoothing roll adjacent and beyond said equalizing bar, and means for adjusting said equalizing bar to vary the angle at which the paper is delivered thereto from the coating roll and therefrom to said smoothing roll.

16. A paper coating machine, comprising a coating roll, means for feeding a paper web in contact therewith, and an equalizing bar formed as a circular rod of small diameter arranged adjacent said coating roll to receive the paper directly therefrom, said rod having provision for rotary adjustment on its axis.

17. A paper coating machine, comprising a coating roll, means for feeding a paper web in contact therewith, an equalizing bar consisting in a circular rod of small diameter arranged adjacent said roll to receive the paper directly therefrom, and separate means for supporting said bar throughout substantially its entire length.

18. A paper coating machine, comprising a coating roll, and an equalizing bar coöperative therewith, composed of a circular rod having a finely scalloped periphery.

19. A paper coating machine, comprising a coating roll, and an equalizing bar cooperative therewith, composed of a circular rod having a finely threaded periphery.

20. In a paper coating machine, an equalizing bar having an operative portion formed on an arc of small curvature in cross section, and finely scalloped throughout its length.

21. In a paper coating machine, the combination of an equalizing bar, there being a wire of fine diameter wrapped helically around said bar and continuous from one end thereof to the other.

22. In a paper coating machine, the combination of an equalizing bar, there being a fine capillary fissure extending helically around said bar from one end thereof to the other.

23. In a paper coating machine, an equalizing bar of small diameter, there being a fine capillary fissure extending helically around said bar from one end thereof to the other, said fissure being made by wrapping said bar helically with fine wire from one end to the other.

24. A paper coating machine, comprising a coating roll, an equalizing bar in position to receive the paper directly therefrom, said bar having an operative edge formed as an arc of small radius, and means for rapidly vibrating said bar endwise, said bar being arranged to support the paper and bend it at a sharp angle therearound.

25. A paper coating machine, comprising mechanism for feeding paper and coating the same, and an equalizing bar over which the coated paper passes, having its engaging edge formed as an arc of small radius, and means for rapidly vibrating said bar endwise, said bar having provision for rotary adjustment on its axis.

26. A paper coating machine, comprising mechanism for feeding and coating paper, an equalizing bar in position to engage the coated paper formed as a finely threaded rod, and means for rapidly vibrating said bar endwise.

27. A paper coating machine, comprising mechanism for feeding and coating paper, an equalizing bar arranged adjacent the coating portion of the mechanism to receive the paper therefrom, said bar being formed with a finely scalloped operative edge curved to an arc of small radius in cross section, and means for rapidly vibrating said bar endwise.

28. A paper coating machine, comprising mechanism for feeding and coating paper, an equalizing bar having a finely threaded operative edge adjacent the coating portion of said mechanism, positively driven means for rapidly moving said bar endwise in one direction, and a spring for returning the bar.

29. A paper coating machine, comprising paper feeding and coating mechanism, an equalizer bar formed as a finely scalloped rod in position to engage the coated paper, a separate support for said bar throughout its length, and means for applying heat to said bar to keep the coating material soft.

30. A paper coating machine, comprising mechanism for feeding and coating paper, an equalizing bar formed as a finely threaded rod in position to receive the coated paper, means for supporting said rod throughout its length, and means for rapidly vibrating said rod endwise on said supporting means.

31. A paper coating machine, comprising mechanism for feeding and coating paper, an equalizing bar formed as a rod wound with fine wire in position to receive the coated paper, and means for rapidly vibrating said rod for producing wave-like lines on the coated paper.

32. In a paper coating machine, the combination of an equalizing bar, a support through which the end of said bar travels, a cylindrical bearing on the end of said support concentric with said bar, a hanger surrounding said cylindrical bearing having attached thereto a tube having flat sides, said hanger and said tube being angularly adjustable on said cylindrical bearing to vary the position of said tube.

33. In a paper coating machine, the combination of an equalizing bar, a support through which the end of said bar travels, a cylindrical bearing on the end of said support concentric with said bar, a hanger surrounding said cylindrical bearing having attached thereto a tube having flat sides, said hanger and said tube being angularly adjustable on said cylindrical bearing to vary the position of said tube, a bar or plate fastened to one of the flat sides of said tube and forming a recess therewith, in which recess rests said equalizing bar.

34. In a paper coating machine, the combination of an equalizing bar, a hanger for supporting one end thereof, a fork having a square shank attached to one end of said equalizing bar, a bearing in which said square shank rests and reciprocates, said bearing having a square opening with which said square shank engages, by which the rotation of said square shank is prevented.

35. In a paper coating machine, the combination of a hanger, a shank to reciprocate therein but prevented from rotating therein, a square shoulder on said shank, a shoulder on said hanger, a spring surrounding said shank and compressed between the shoulder on said shank and the shoulder on said hanger, said spring tending to drive said shank in one direction.

36. In a paper coating machine, the combination of means for producing a paper web having a layer of coating material thereon, an equalizing bar over which said paper web is adapted to pass, a tube having flat sides supporting said equalizing bar, means for raising or lowering either end of said tube and said equalizing bar independent of the other end, and means for varying the angular adjustment of said tube independent of said means.

37. In a paper coating machine, the combination of means for producing a paper web having a layer of coating material thereon, an equalizing bar over which said paper web is adapted to pass, a tube having flat sides supporting said equalizing bar, a pivoted arm supporting each end of said tube, and a bearing between said tube and said pivoted arm at each end, permitting the angular adjustment of said tube on said arms.

38. In a paper coating machine, the combination of means for feeding a paper web, a coating roll adapted to put a layer of coating material on said paper web, an equalizing bar adapted to remove the surplus coating material from said paper web, a tube having flat sides adapted to support said equalizing bar, said flat sides being adapted to permit the excess of coating material removed by said equalizing bar to flow away from said equalizing bar.

39. In a paper coating machine, the combination of means for feeding a paper web, a coating roll over which said web is adapted to travel, a dope pan in which said coating roll is partly immersed, an equalizing bar and a support therefor mounted adjacent and parallel to said coating roll and over said dope pan, said equalizing bar being adapted to remove the excess of coating material from said paper web, said support for said equalizing bar having flat sides which are adapted to facilitate the return of the excess coating material to the dope pan.

40. In a paper coating machine, the combination of means for feeding a paper web, a coating roll over which said web is adapted to travel, a dope pan in which said coating roll is partly immersed, an equalizing bar and a support therefor mounted adjacent and parallel to said coating roll and over said dope pan, said equalizing bar being adapted to remove the excess of coating material from said paper web, said support for said equalizing bar having flat sides which are adapted to facilitate the return of the excess coating material to the dope pan, means for heating said support.

41. A paper coating machine, comprising a frame, a coating roll mounted at the forward end thereof, a dope pan having a mounting in inclined guides extending downwardly and forwardly at the front of the frame, and a rack and pinion adjustment for said pan adapted to hold the same in any desired position.

42. A paper coating machine, comprising a coating roll having provision for heating the same, and a shoe with a scraping edge mounted and having bearing on said coating roll and being heated thereby, said scraping edge being in position to remove excess coating from a web of paper after contact with the coating roll.

43. A paper coating machine, comprising a coating roll having provision for heating the same, and a shoe having a scraping edge mounted for bearing rest on said roll and adapted to be heated thereby, said shoe having a series of openings in its under side through which an excess of coating material may escape.

44. A paper coating machine, comprising a coating roll, a shoe mounted to have bearing support on said coating roll and in position to receive a web of paper fed in contact with said coating roll, said shoe having openings on its under side for the escape of an excess of coating material, and means for adjusting said shoe forward or backward on said coating roll.

45. A paper coating machine, comprising a coating roll, and a shoe mounted for bearing support on said coating roll, said shoe having a detachable edge for engaging a web of paper fed in contact with the coating roll, said shoe having a series of openings for the escape of excess of coating material, and the shoe being adapted to receive either a sharp scraping edge, a dull scraping edge, or a wire wound rod.

46. A paper coating machine, comprising a coating roll, a shoe having a scraping edge mounted to rest on said coating roll, and means for simultaneously heating said roll and shoe.

47. A paper coating machine, comprising a frame, paper feeding and coating mechanism mounted thereon, consisting in a supply roll at the rear of the machine, coating means at the front of the machine having a roll mounted in a forward lower extension of the frame, a second roll mounted above and rearward of said first named roll, and means for tensioning a web of paper over said rolls to be in convenient position for inspection, said means consisting in winding-on devices mounted at the rear of the machine above said supply roll.

48. A paper coating machine, comprising a frame, coating mechanism mounted therein, tension rollers for continuously feeding the paper, and a separate winding roll receiving the paper from said tension rollers, said winding roll having a relatively light friction drive for the purpose stated.

49. A paper coating machine, comprising paper coating mechanism, tension rolls for continuously drawing the paper, having also provision for cooling the same, and a separate winding-on roll, to receive paper from said tension rolls having a relatively light friction drive.

50. A paper coating machine, comprising a frame, paper coating mechanism, and feeding mechanism therefor, consisting in plural rolls, each with provision for cooling, arranged for the paper to pass to a farther roll in proximity to but out of contact with an intermediate cooling roll, whereby a preliminary chilling thereof is effected.

51. A paper coating machine, comprising a frame, paper coating mechanism mounted thereon, drawing rolls for feeding the paper thereto, a winding roll for receiving the paper from said drawing rolls having a relatively light friction drive, and means for presenting the edges of the web evenly to said winding roll.

52. In a paper coating machine, the combination of a supply roll having a shaft therefor that revolves integral therewith, a bearing supporting said shaft, a block engaging said shaft, a lever pivoted on said bearing and engaging said block, yieldingly forcing it into engagement with said shaft, a screw adjustably connecting the end of said lever to said bearing for varying the frictional engagement between said bearing and said shaft, a base on which said bearing is adapted to slide, a compression spring yieldingly holding said bearing at the rear end of said base and adapted to yield to permit the roll to advance on said base.

53. In a paper coating machine, the combination of a supply roll having a shaft therefor that revolves integral therewith, a bearing supporting said shaft, a block engaging said shaft, a lever pivoted on said bearing and engaging said block, yieldingly forcing it into engagement with said shaft, a screw adjustably connecting the end of said lever to said bearing for varying the frictional engagement between said bearing and said shaft, a base on which said bearing is adapted to slide, a compression spring yieldingly holding said bearing at the rear end of said base and adapted to yield to permit the roll to advance on said base, rollers between said bearing and said base to reduce the friction therebetween.

54. In a paper coating machine, the combination of means for supplying a paper web, a coating roll, an equalizing bar, and first, second, third and fourth cooling rolls, said second cooling roll being adapted to be used as a coating roll, tubes leading into and draining from said first, second, third and fourth cooling rolls, means for delivering a supply of cooling material to which said tubes are permanently connected, means for delivering a supply of heating material to which the first and second of said cooling rolls are permanently connected, valves to shut off the supply of cooling material from the first and second of the cooling rolls, and valves to admit the heating material to the first and second rolls when the second roll is used as a coating roll.

55. In a paper coating machine, the combination of means for supplying a paper web, a coating roll, an equalizing bar, and first, second, third and fourth cooling rolls, devices leading into and draining from said first, second, third and fourth cooling rolls, means for delivering a supply of cooling material to which said tubes are permanently connected, means for delivering a supply of heating material to which the first of said rolls is permanently connected, valves to shut off the supply of cooling material from the first cooling roll, and valves to admit heating material to the first roll for the purpose of heating the first roll to anneal the paper.

56. In a paper coating machine, the combination of means for supplying a paper web, a coating roll, an equalizing bar, and first and second cooling rolls, tubes leading into and draining from said first and second cooling rolls, means for delivering a supply of cooling material to which said tubes are permanently connected, means for delivering a supply of heating material to which both of said rolls are permanently connected, valves to shut off the supply of cooling material from either the first or second cooling roll, and valves to separately admit heating material to the first roll or to the first and second rolls to anneal the paper.

57. In a paper coating machine, the combination of means for supplying a paper web, a coating roll, an equalizing bar and first, second, third and fourth cooling rolls, said second cooling roll being adapted to be used as a coating roll, an equalizing bar, a support therefor mounted adjacent to said second cooling roll and adapted to be placed in position to engage under the paper as it leaves said second roll when it is used as a coating roll.

58. In a paper coating machine, the combination of a roll having bearings therefor, arms concentric with the bearings of said roll, a support carried by said arms, and an equalizing bar carried on said support.

59. In a paper coating machine, the combination of a roll having bearings therefor, arms concentric with the bearings of said roll, a support carried by said arms, an equalizing bar carried on said support and through said arms being angularly adjustable around said roll and maintained in a uniform position with regard thereto.

60. In a paper coating machine, the combination of a roll having bearings therefor, arms concentric with the bearings of said roll, a support carried by said arms, an equalizing bar carried on said support, a cam wheel integrally connected to said roll and rotating therewith, said cam wheel operating on said equalizing bar to cause the reciprocation thereof.

61. In a paper coating machine, the combination of a coating roll, first and second cooling rolls, a paper web traveling over said rolls at the same peripheral velocity with said first and second rolls but at a higher velocity than said coating roll, means for driving said second roll at a reduced velocity to permit its being used as a coating roll.

62. A paper coating machine, comprising a coating roll, a plurality of ironing devices for straightening and smoothing the paper as it is fed to said roll, one of said devices being arranged closely adjacent the coating roll, and means for adjusting said devices so that both or only one are in operative position to act on the web at will.

63. A paper coating machine, comprising a coating roll, a plurality of ironing devices for straightening and smoothing the paper as it is fed to said roll, one of said devices being arranged closely adjacent the coating roll, and means for effecting a swinging adjustment of said ironing devices whereby the one thereof relatively remote from the roll may be swung out of operative position at will.

In testimony whereof I affix my signature in presence of two witnesses.

CHARLES W. MAYER.

Witnesses:
RAYMOND J. SAXE,
JACOB L. ALBRECHT.